US008625151B2

(12) United States Patent
Hayashi et al.

(10) Patent No.: US 8,625,151 B2
(45) Date of Patent: Jan. 7, 2014

(54) MOVEMENT DETECTION APPARATUS AND RECORDING APPARATUS

(75) Inventors: Masashi Hayashi, Kawasaki (JP); Hitoshi Nishikori, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 489 days.

(21) Appl. No.: 12/911,606

(22) Filed: Oct. 25, 2010

(65) Prior Publication Data

US 2011/0102816 A1 May 5, 2011

(30) Foreign Application Priority Data

Oct. 30, 2009 (JP) ................................ 2009-250830

(51) Int. Cl.
*G06K 15/02* (2006.01)

(52) U.S. Cl.
USPC .................. 358/1.5; 358/1.2; 347/8; 400/582

(58) Field of Classification Search
None
See application file for complete search history.

(56) References Cited

U.S. PATENT DOCUMENTS

| | | | | |
|---|---|---|---|---|
| 8,319,806 | B2 * | 11/2012 | Mikami | 347/110 |
| 2005/0053408 | A1 | 3/2005 | Otsuka | |
| 2006/0119633 | A1 | 6/2006 | Hsu | |
| 2008/0030536 | A1 | 2/2008 | Furukawa | |
| 2009/0058895 | A1 * | 3/2009 | Kida | 347/8 |
| 2010/0254744 | A1 * | 10/2010 | Taniguchi | 400/582 |
| 2011/0027404 | A1 * | 2/2011 | Siddiqui et al. | 425/377 |
| 2011/0102814 | A1 * | 5/2011 | Okamura | 358/1.5 |
| 2011/0102815 | A1 * | 5/2011 | Watanabe | 358/1.5 |

FOREIGN PATENT DOCUMENTS

| | | | |
|---|---|---|---|
| CN | 1721198 | A | 1/2006 |
| CN | 101105667 | A | 1/2008 |
| CN | 101403874 | A | 4/2009 |
| EP | 1647411 | A2 | 4/2006 |
| EP | 2138317 | A2 | 12/2009 |
| GB | 2334517 | A | 8/1999 |
| JP | 9-81340 | A | 3/1997 |
| JP | 9-81340 | C | 3/1997 |
| JP | 2001-163477A | A | 6/2001 |
| JP | 2004-015965A | A | 1/2004 |
| JP | 2007-217174 | A | 8/2007 |
| JP | 2007-217176 | A | 8/2007 |

* cited by examiner

*Primary Examiner* — Steven Kau
*Assistant Examiner* — Ashish K Thomas
(74) *Attorney, Agent, or Firm* — Canon U.S.A., Inc. IP Division

(57) ABSTRACT

A conveyance mechanism includes a conveyance belt having a detection pattern containing a plurality of isolated patterns. The shape of the plurality of isolated patterns contained in the detection pattern, the size of a template area from which a template pattern is to be extracted, and the size of a seek area are associated with each other so that a part of the detection pattern contained in the template pattern extracted from first image data invariably serves as a unique pattern in the seek area of second image data.

18 Claims, 19 Drawing Sheets

MOVEMENT DETECTION APPARATUS AND RECORDING APPARATUS

BACKGROUND OF THE INVENTION

1. Field of the Invention

The present invention relates to a technique for detecting the movement of an object through image processing, and to a technical field of a recording apparatus.

2. Description of the Related Art

When performing printing on a medium such as a print sheet while it is being conveyed, a low conveyance precision causes an uneven density of a halftone image or a magnification error, resulting in degraded quality of a printed image. Therefore, although recording apparatuses employ high-precision components and carry an accurate conveyance mechanism, there is a strong demand for higher print quality and higher conveyance precision. At the same time, there is also a strong demand for cost reduction. The achievement of both higher precision and lower cost is demanded.

To meet this demand, an attempt is made to detect the movement of a medium with high precision to achieve stable conveyance through feedback control. A method used in this attempt, also referred to as direct sensing, images the surface of the medium to detect through image processing the movement of the medium being conveyed.

Japanese Patent Application Laid-Open No. 2007-217176 discusses a method for detecting the movement of the medium. The method in Japanese Patent Application Laid-Open No. 2007-217176 images the surface of a moving medium a plurality of times in a time sequential manner by using an image sensor, and compares acquired images through pattern matching to detect an amount of movement of the medium. Hereinafter, a method for directly detecting the surface of an object to detect its moving state is referred to as direct sensing, and a detector employing this method is referred to as a direct sensor.

With direct sensing, a template pattern is extracted from first image data, and an area having a large correlation with the template pattern is sought among areas in second image data through image processing. In this process, a pattern which is identical or very similar to a certain template pattern may exist at a plurality of positions within a seek range. In this case, if a wrong position among the plurality of positions is determined in pattern matching, a detection error results. Therefore, for high-precision direct sensing, a template pattern becomes a unique pattern within the seek range.

SUMMARY OF THE INVENTION

According to an aspect of the present invention, an apparatus includes a conveyance mechanism including a conveyance belt having detection patterns containing a plurality of isolated patterns and configured to convey a medium in a predetermined direction, a sensor configured to capture an image of an area on the conveyance belt containing at least a part of the detection patterns to acquire first and second data, and a processing unit configured to extract a template pattern containing a part of the detection patterns from the first data, and seek an area having a correlation with the template pattern within a seek area of the second data to obtain a moving state of the conveyance belt, wherein form of the plurality of isolated patterns contained in the detection patterns, size of the template pattern, and size of the seek area are associated with each other so that the part of the detection patterns contained in the template pattern serves as a unique pattern in the seek area.

According to the present invention, direct sensing reliably enables detecting a moving state of an object with high precision.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. However, the components described in the following exemplary embodiments are illustrative and are not meant to limit the scope of the present invention.

The scope of the present invention widely ranges from a printer to a field of movement detection requiring high-precision detection of the movement of an object. For example, the present invention is applicable to printers, scanners, and other devices used in technical, industrial, and physical distribution fields for conveying an object and performing inspection, reading, processing, marking, and other various pieces of processing to the object. Further, the present invention is applicable to diverse types of printers including ink jet printers, electrophotographic printers, thermal printers, and dot impact printers. In the present specification, a medium means a sheet-like or plate-shaped medium such as paper, a plastic sheet, a film, glass, ceramics, resin, and so on. Further, in the present specification, the upstream and downstream sides mean the upstream and downstream sides of the sheet movement direction at the time of image recording on a sheet.

An embodiment of an ink jet printer which is an exemplary recording apparatus will be described below. The printer according to the present exemplary embodiment is termed a serial printer which alternately performs main scanning and sub scanning to form a two-dimensional image. With main scanning, the printer reciprocally moves a print head. With sub scanning, the printer conveys a medium in a stepwise feeding by a predetermined amount. The present invention is applicable not only to a serial printer but also to a line printer having a full line print head covering the print width which moves a medium with respect to the fixed print head to form a two-dimensional image.

Figure 1:
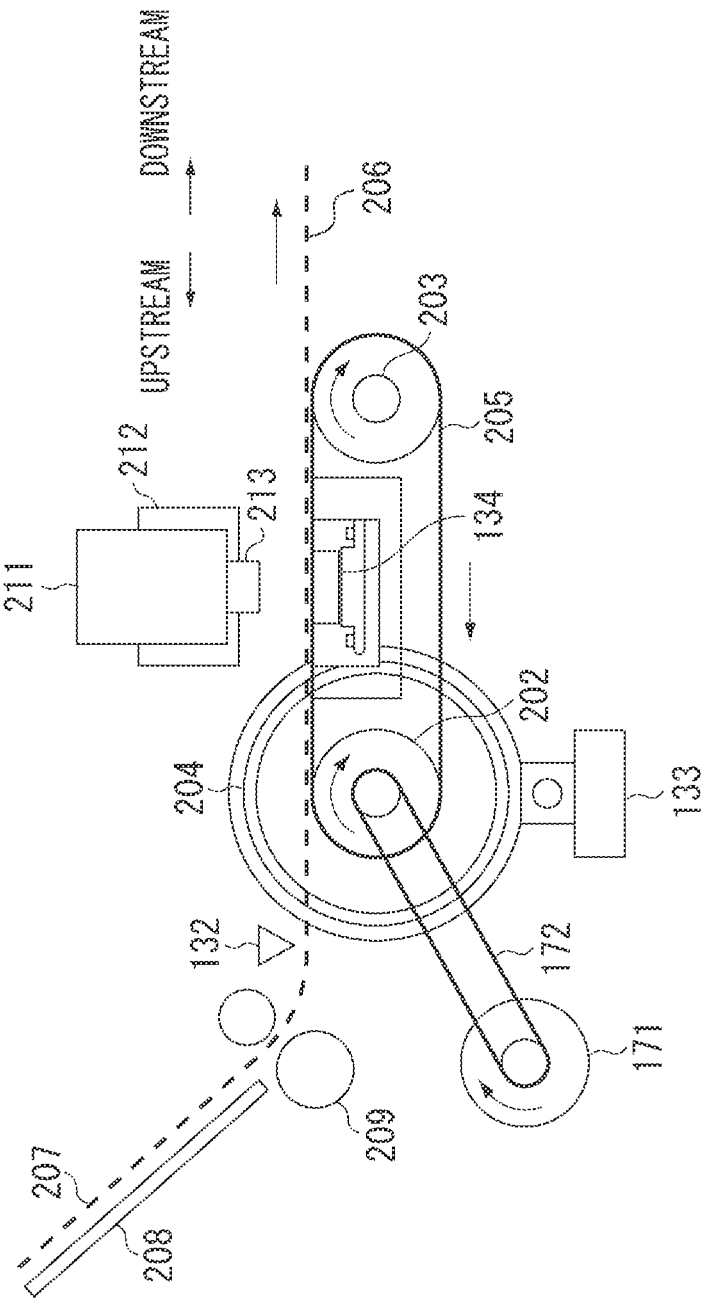
FIG. 1 is a sectional view of a printer of an exemplary embodiment of the present invention.

FIG. 1 is a sectional view illustrating a configuration of a part of a printer. The printer includes a conveyance mechanism for moving the medium in the sub scanning direction (first direction or a predetermined direction) by a belt conveyance system, and a recording unit configured to perform recording on the moving medium by using a print head. The printer further includes a rotary encoder 133 configured to indirectly detect a moving state of an object, and a direct sensor 134 configured to directly detect the moving state of the object.

The conveyance mechanism includes a first roller 202 and a second roller 203 which are rotating members, and a wide conveyance belt 205 applied between the first and second rollers by a predetermined tension. A medium 206 adhering to the surface of the conveyance belt 205 by electrostatic attraction or adhesion is conveyed by the movement of the conveyance belt 205. The rotational force of the conveyance motor 171, a driving source for sub scanning, is transmitted to the first roller 202, i.e., a drive roller, via the drive belt 172 to rotate the first roller 202. The first roller 202 and the second roller 203 rotate in synchronization with each other via the conveyance belt 205. The conveyance mechanism further includes a feed roller pair 209 for separating one medium from media 207 loaded on a tray 208 and feeding it onto the conveyance belt 205, and a feed motor 161 (not illustrated in FIG. 1) for driving the feed roller pair 209. A paper end sensor 132 disposed on the downstream side of the feed motor 161 detects a leading edge or trailing edge of a medium to acquire a timing of medium conveyance.

The rotary encoder (rotational angle sensor) 133 is used to detect a rotating state of the first roller 202 to indirectly acquire the moving state of the conveyance belt 205. The rotary encoder 133 including a photograph interrupter optically reads slits circumferentially arranged at equal intervals on a code wheel 204 coaxially attached to the first roller 202 to generate a pulse signal.

The direct sensor 134 is disposed below the conveyance belt 205 (on the rear surface side of the medium 206, i.e., the side opposite to the side on which the medium 206 is loaded). The direct sensor 134 includes an image sensor (imaging device) for capturing an image of an area containing markers on the surface of the conveyance belt 205. The direct sensor 134 directly detects a moving state of the conveyance belt 205 through image processing to be described below. Since the medium 206 firmly sticks to the surface of the conveyance belt 205, a variation in the relative position by the slip between the surface of the conveyance belt 205 and the medium 206 is vanishingly small. Therefore, it is assumed that the direct sensor 134 can directly detect a moving state of the medium 206. The function of direct sensor 134 is not limited to capturing an image of the rear surface of the conveyance belt 205, but may be configured to capture an image of an area on the front surface of the conveyance belt 205 not covered by the medium 206. Further, the direct sensor 134 may capture an image of the surface of medium 206 instead of the surface of the conveyance belt 205.

The recording unit includes a carriage 212 reciprocally moving in the main scanning direction, a print head 213, and an ink tank 211, the latter two being mounted on the carriage 212. The carriage 212 reciprocally moves in the main scanning direction (second direction) by the driving force of a main scanning motor 151 (not illustrated in FIG. 1). Nozzles of the print head 213 discharge ink in synchronization with the movement of the carriage 212 to perform printing on the medium 206. The print head 213 and the ink tank 211 may be detachably attached to the carriage 212 either integrally as one unit or individually as separate components. The print head 213 discharges ink through the ink jet method. The ink discharge method may be based on a heater element, a piezoelectric element, an electrostatic element, an MEMS element, and so on.

Figure 2:
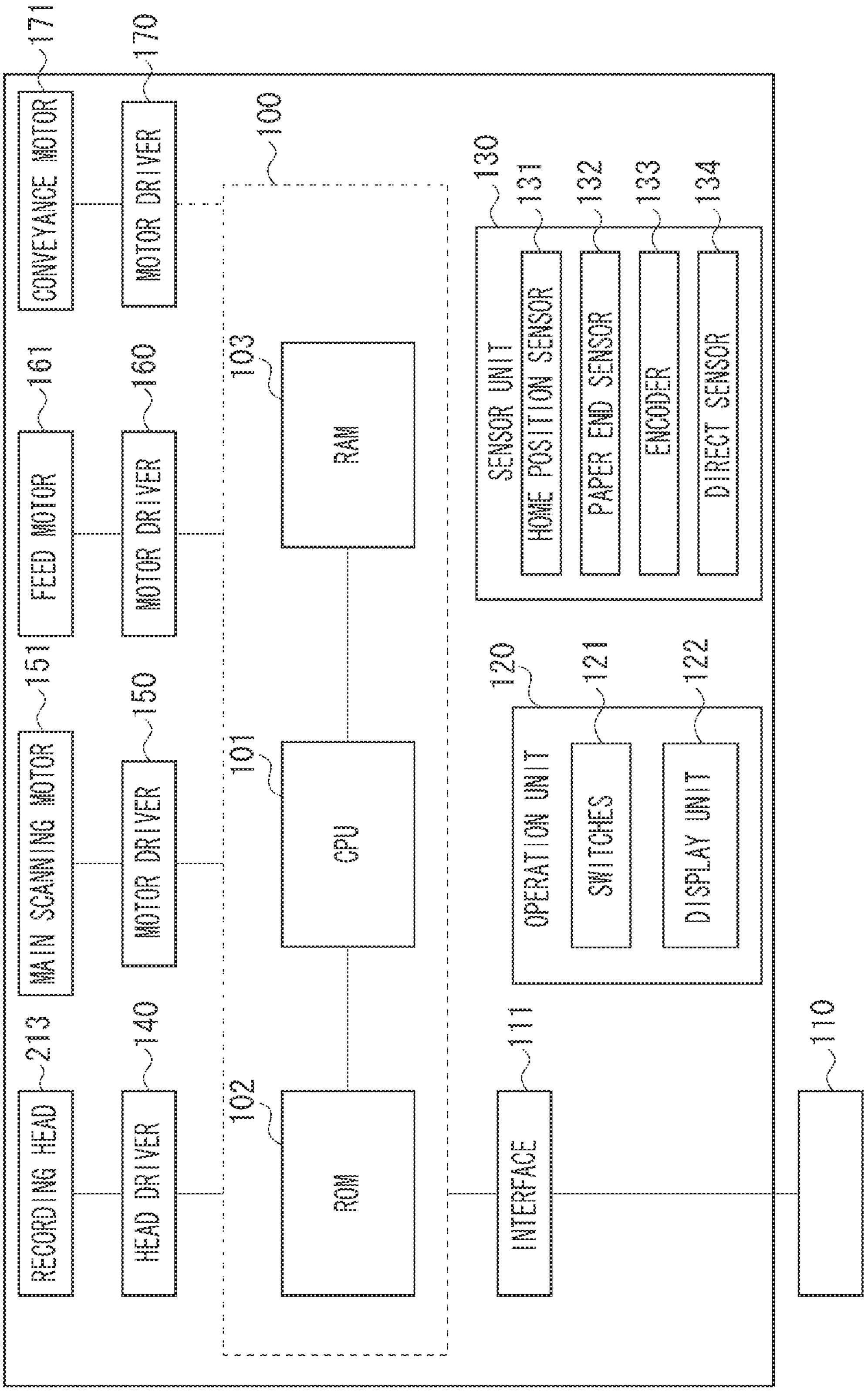
FIG. 2 is a system block diagram of the printer.

FIG. 2 is a system block diagram of the printer. A controller 100 includes a central processing unit (CPU) 101, a read-only memory (ROM) 102, and a random access memory (RAM) 103. The controller 100 serves also as a control unit and a processing unit to perform various control of the entire printer as well as image processing. An information processing apparatus 110 is an apparatus which supplies image data to be recorded on a medium, such as a computer, a digital camera, a TV, and a mobile phone. The information processing apparatus 110 is connected with the controller 100 via an interface 111. An operation unit 120, which is a user interface for an operator, includes various input switches 121 including a power switch and a display unit 122. A sensor unit 130 includes various sensors for detecting various states of the printer. A home position sensor 131 detects the home position of the carriage 212 reciprocally moving. The sensor unit 130 includes the above-mentioned paper end sensor 132, the rotary encoder 133, and the direct sensor 134. Each of these sensors is connected to the controller 100. Based on commands of the controller 100, the print head and various motors for the printer are driven via respective drivers. A head driver 140 drives the print head 213 according to record data. A motor driver 150 drives the main scanning motor 151. A motor driver 160 drives the feed motor 161. A motor driver 170 drives the conveyance motor 171 for sub scanning.

Figure 3:
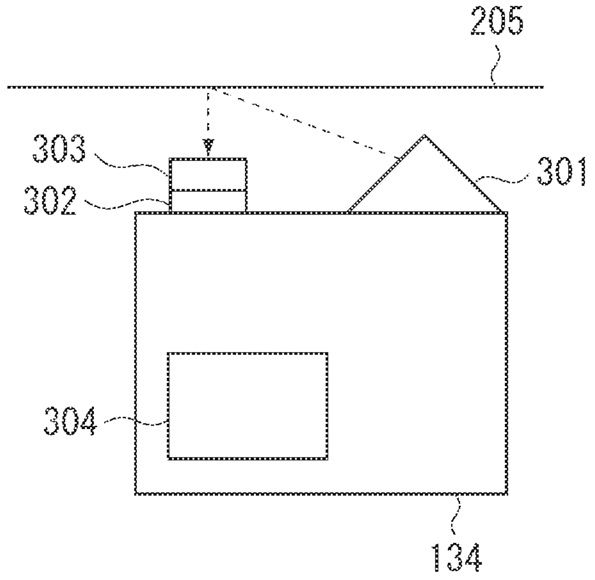
FIG. 3 illustrates a configuration of a direct sensor.

FIG. 3 illustrates a configuration of the direct sensor 134 for performing direct sensing. The direct sensor 134 is a single sensor unit which includes a light-emitting unit including a light source 301 such as a light-emitting diode (LED), an organic light-emitting diode (OLED), and a semiconductor laser; a light receiving unit including an image sensor 302 and an imaging optical system 303 such as a refractive-index distribution lens array; and a circuit unit 304 such as a drive circuit and an A/D converter circuit. The light source 301 illuminates a part of the rear surface of the conveyance belt 205 which is an image capture target. The image sensor 302 images via the imaging optical system 303 a predetermined imaging area illuminated by the light source 301. The image sensor 302 is a two-dimensional area sensor such as a CCD image sensor and a CMOS image sensor, or a line sensor. An analog signal from the image sensor 302 is converted to digital form and captured as digital image data. The image sensor 302 is used to image the surface of an object (conveyance belt 205) and acquire a plurality of pieces of image data at different timings (these pieces of image data acquired in succession are referred to as first and second image data). As described below, by extracting a template pattern from the first image data, and seeking an area in the second image data having a large correlation with the extracted template pattern through image processing, the moving state of the object can be acquired. The image processing may be performed by the controller 100 or a processing unit included in the unit of the direct sensor 134.

Figure 4:
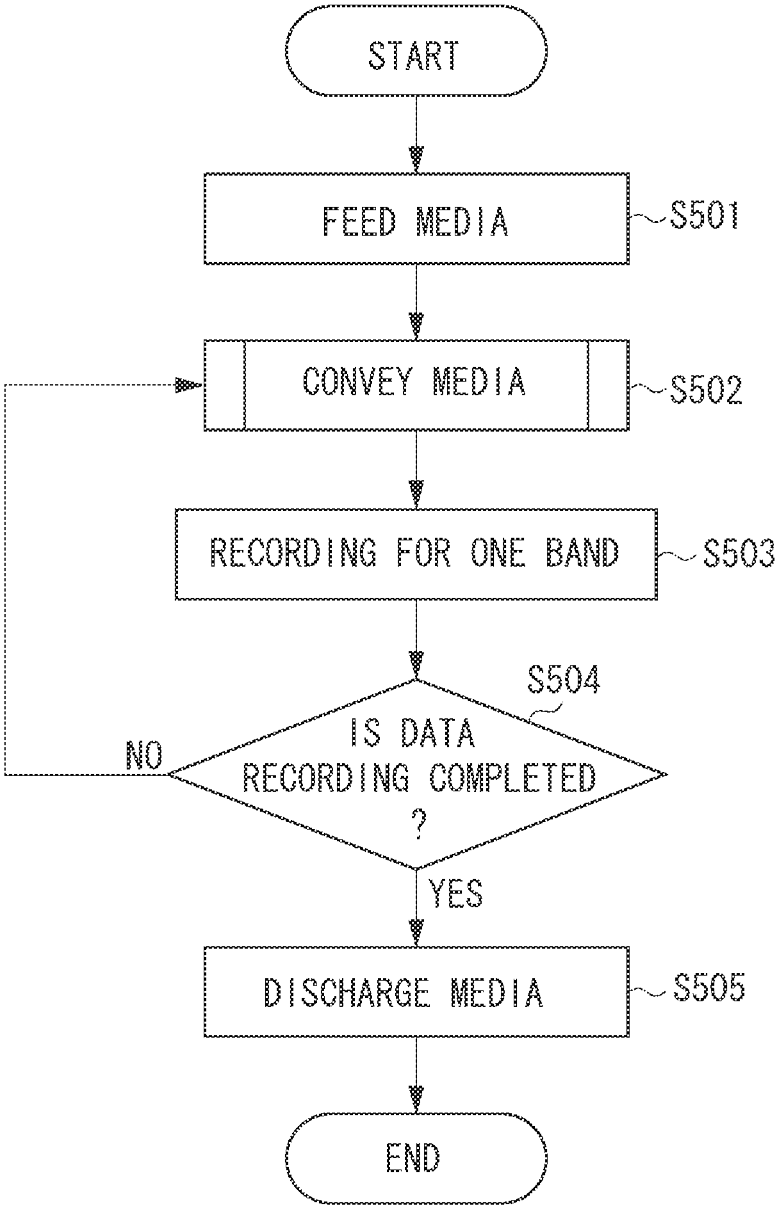
FIG. 4 is a flow chart illustrating processing of medium feeding, recording, and discharging.

FIG. 4 is a flow chart illustrating processing of medium feeding, recording, and discharging. This processing is performed based on commands of the controller 100. In step S501, the processing drives the feed motor 161 to rotate the feed roller pair 209 to separate one medium from the medium 207 on the tray 208 and feed it along the conveyance path. When the paper end sensor 132 detects the leading edge of the medium 206 being fed, the processing performs the medium positioning operation based on the detection timing to convey the medium to a predetermined recording start position.

In step S502, the processing conveys the medium in a stepwise feeding by a predetermined amount by using the conveyance belt 205. The predetermined amount equals the length in the sub scanning direction in recording of one band (one main scanning of the print head). For example, when performing multipass recording in a two-pass manner while causing each stepwise feeding by the length of a half of the nozzle array width in the sub scanning direction of the print head 213, the predetermined amount equals the length of a half of the nozzle array width.

In step S503, the processing performs recording for one band while moving the print head 213 in the main scanning direction by the carriage 212. In step S504, the processing determines whether recording of all record data is completed. When the processing determines that recording is not completed (NO in step S504), the processing returns to step S502 to repeat recording in a stepwise feeding (sub scanning) and one band (one main scanning). When the processing determines that recording is completed (YES in step S504), the processing proceeds to step S505. In step S505, the processing discharges the medium 206 from the recording unit, thus forming a two-dimensional image on the medium 206.

Figure 5:
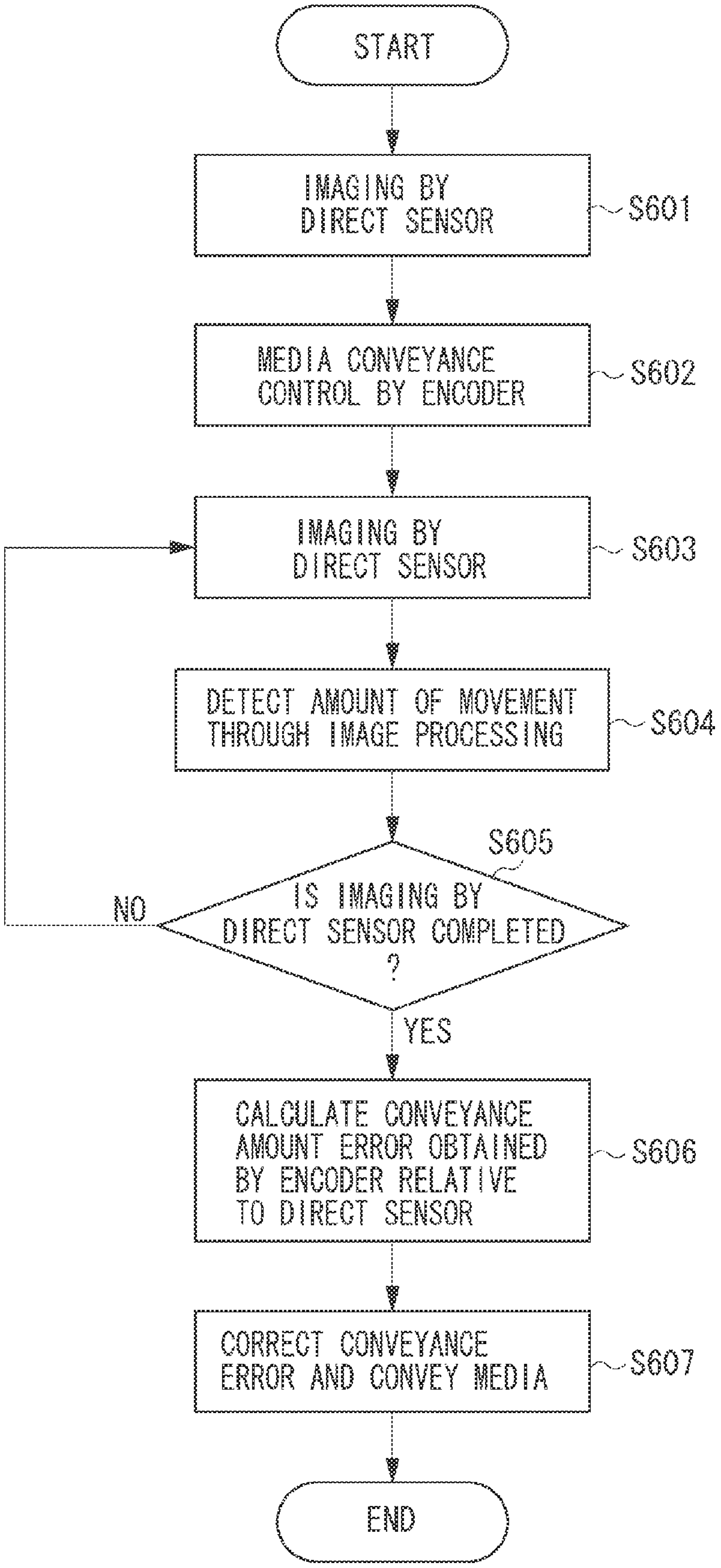
FIG. 5 is a flow chart illustrating processing of medium conveyance.

Processing of the stepwise feeding in step S502 will be described in detail below with reference to the flow chart illustrated in FIG. 5. In step S601, an image of an area containing markers of the conveyance belt 205 is captured by using the image sensor of the direct sensor 134. The acquired image data denotes the position of the conveyance belt 205 before starting movement and is stored in the RAM 103. In step S602, while monitoring the rotating state of the roller 202 by the rotary encoder 133, the processing drives the conveyance motor 171 to move the conveyance belt 205, in other words, starts conveyance control for the medium 206. The controller 100 performs servo control so that the medium 206 is conveyed by a target conveyance amount. The processing executes step S603 and subsequent steps in parallel with the medium conveyance control using the rotary encoder 133.

In step S603, an image of the conveyance belt 205 is captured by using the direct sensor 134. Specifically, the processing starts imaging the conveyance belt 205 when the medium is assumed to have been conveyed by a predetermined amount based on the target amount of medium conveyance (hereinafter referred to as target conveyance amount) to perform recording for one band, the image sensor width in the first direction, and the medium movement speed. In this example, a specific slit on the code wheel 204 to be detected by the rotary encoder 133 when the medium has been conveyed by a predetermined conveyance amount is specified, and the processing starts imaging the conveyance belt 205 when the rotary encoder 133 detects the slit. Step S603 will be described in detail below.

In step S604, through image processing, the processing detects the distance over which the conveyance belt 205 has moved between imaging timing of the second image data in step S603 and that of the first image data in the previous step. Processing for detecting an amount of movement will be described below. An image of the conveyance belt 205 is captured the number of times predetermined for the target conveyance amount at predetermined intervals. In step S605, the processing determines whether the image of the conveyance belt 205 has been captured the predetermined number of times. When the image of the conveyance belt 205 has not been captured the predetermined number of times (NO in step S605), the processing returns to step S603 to repeat processing until imaging is completed. The processing repeats the processing the predetermined number of times while accumulating a conveyance amount each time a conveyance amount is detected, thus obtaining a conveyance amount for one band from the timing of first imaging in step S601. In step S606, the processing calculates a difference between a conveyance amount acquired by the direct sensor 134 and a conveyance amount acquired by the rotary encoder 133 for one band. Since the rotary encoder 133 indirectly detects a conveyance amount while the direct sensor 134 directly detects a conveyance amount, the detection precision of the former is lower than that of the latter. Therefore, the above-mentioned difference can be recognized as a detection error of the rotary encoder 133.

In step S607, the processing corrects medium conveyance control by the detection error amount of the rotary encoder obtained in step S606. There are two different correction methods: a method for increasing or decreasing the current position information for medium conveyance control by the detection error, and a method for increasing or decreasing the target conveyance amount by the detection error. Either method can be employed. When the processing has accurately conveyed the medium 206 by the target conveyance amount through feedback control, the conveyance operation for one band is completed.

Figure 6:
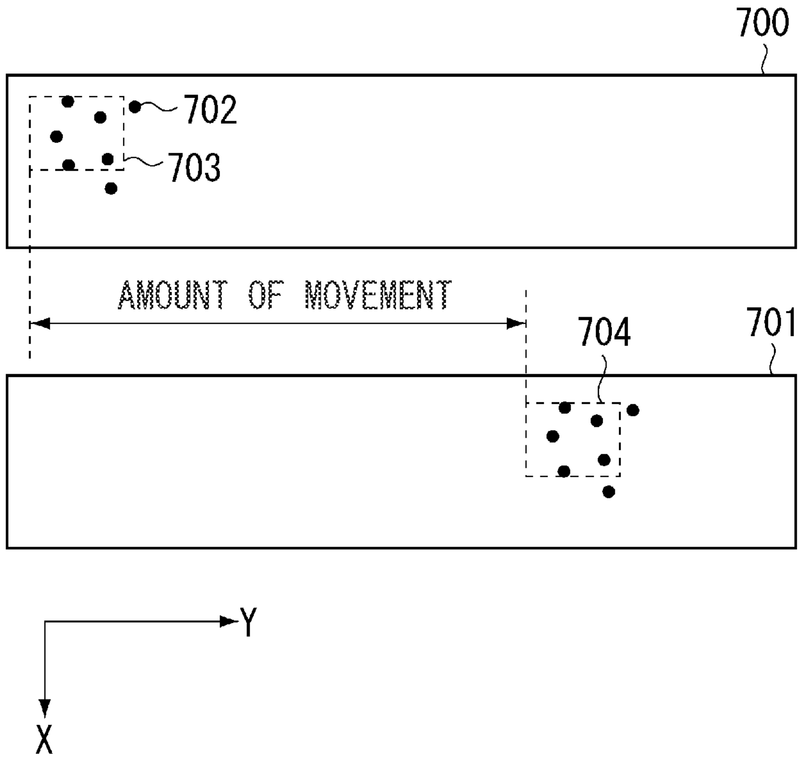
FIG. 6 illustrates processing for obtaining an amount of movement of a medium through pattern matching.
Figure 7:
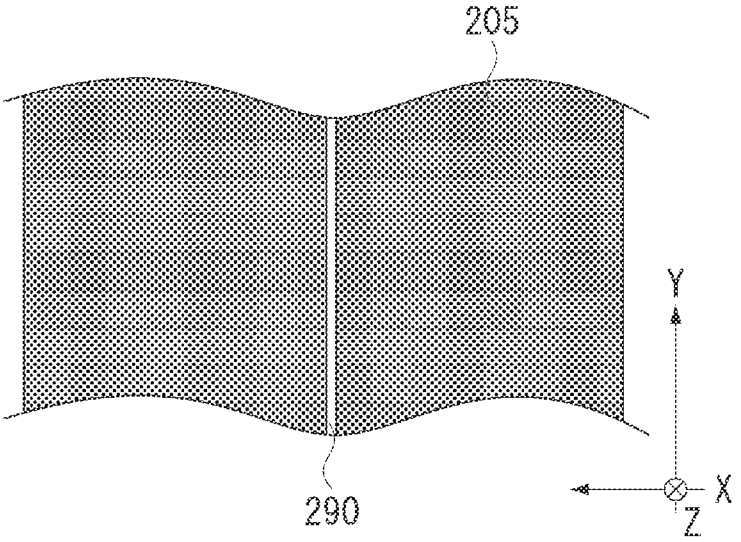
FIG. 7 is a schematic view of the inside of a conveyance belt.

FIG. 6 illustrates in detail direct sensing in step S604. FIG. 7 schematically illustrates first image data 700 and second image data 701 of the conveyance belt 205 acquired in imaging by the direct sensor 134. A black dot pattern 702 (a portion having a luminance gradient) in the first image data 700 and the second image data 701 is an image of one of many markers applied to the conveyance belt 205 on a random basis or based on a predetermined rule. When the subject is a medium as is the case with the apparatus illustrated in FIG. 2, a microscopic pattern on the surface of the medium (for example, a paper fiber pattern) plays a similar role to the markers. The processing sets a template area at an upstream position in the first image data 700, and extracts an image of this portion as a template pattern 703. When the second image data 701 is acquired, the processing searches for a position (within the second image data 701) of a pattern similar to the extracted template pattern 703. Search is made by using a technique of pattern matching. Any one of known similarity determination algorithms including sum of squared difference (SSD), sum of absolute difference (SAD), and normalized cross-correlation (NCC) can be employed. In this example, a most similar pattern is located in an area 704. The processing obtains a difference in the number of pixels of the image sensor (imaging device) in the sub scanning direction between the template pattern 703 in the first image data 700 and the area 704 in the second image data 701. By multiplying the difference in the number of pixels by the distance corresponding to one pixel, the amount of movement (conveyance amount m) can be obtained.

FIG. 7 is a schematic view of the inside of the conveyance belt 205, i.e., a part of an endless belt. An optically recognizable detection pattern 290 is marked in an area on the inner surface of the belt facing the image sensor. The detection pattern 290 is formed over the entire circumferential surface of the conveyance belt 205 along the moving direction (y direction). The detection pattern 290 is marked with at least any one of the following methods (1) to (6).

(1) Directly paint a coating material onto the conveyance belt.
(2) Stick a patterned seal on the conveyance belt.
(3) Form concave and convex portions on the surface of the conveyance belt.
(4) Scrape the film surface of the conveyance belt.
(5) Apply laser marking to the material of the conveyance belt.
(6) Form a non-transparent pattern on the inner surface of a transparent conveyance belt.

Figure 8:
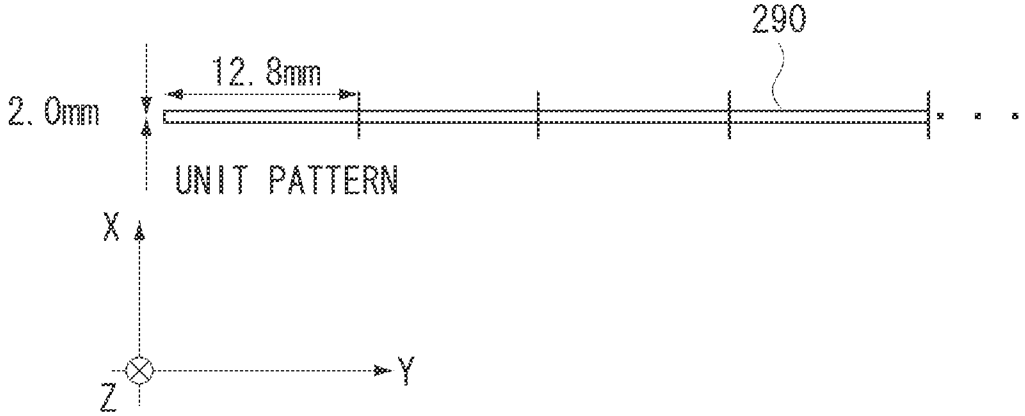
FIG. 8 is an enlarged view of a detection pattern marked on the conveyance belt.

FIG. 8 is an enlarged view of a detection pattern 290 marked on the conveyance belt 205. The detection pattern 290 is oblong along the moving direction (y direction). In one embodiment, the lateral size of the detection pattern 290 is equal to or larger than the imaging area of the image sensor, and is 2.000 mm in this example. The detection pattern 290 is formed by repetitively arranging a unit pattern over the entire circumferential surface of the conveyance belt 205. The unit pattern has a predetermined unit length (one period) not less than the moving directional length of the imaging area to be imaged by the image sensor. In this example, the circumferential length of the conveyance belt 205 is 256 mm, and one unit is 12.800 mm which is 1/20 of the circumferential length of the conveyance belt 205.

Each unit pattern (one unit) forming the detection pattern 290 includes a plurality of isolated patterns arranged so that all of the five rules (first to fifth rules) described below are satisfied.

The first rule is that one or more isolated patterns exist in the template area from which a template pattern is extracted. The size of the template area is associated with isolated patterns so that one or more isolated patterns are invariably contained in the template pattern extracted from the first image data 700. To satisfy this condition, a moving directional interval between isolated patterns contained in a unit pattern is made smaller than the moving directional size of the template area.

If the pitch of isolated patterns is much larger than the size of the template area, there may be a situation that the template area contains no isolated pattern and a blank template pattern is invariably acquired. There may be another situation that a template pattern containing only apart of one isolated pattern is acquired and a blank template pattern is acquired in other cases. Such a template pattern does not serve as a unique pattern in a seek area in which the second image data 701 is sought, and therefore may cause a detection error in pattern matching.

The second rule is that each individual isolated pattern is given uniqueness with which each pattern is distinguishable from other ones. A method for giving uniqueness to each isolated pattern is to differentiate isolated patterns in at least any one of size, shape, contrast, density, color, and arrangement. If the seek area in the second image data contains a plurality of patterns identical or very similar to the template pattern, the template pattern does not serve as a unique pattern and therefore may cause a detection error in pattern matching.

Figure 9:
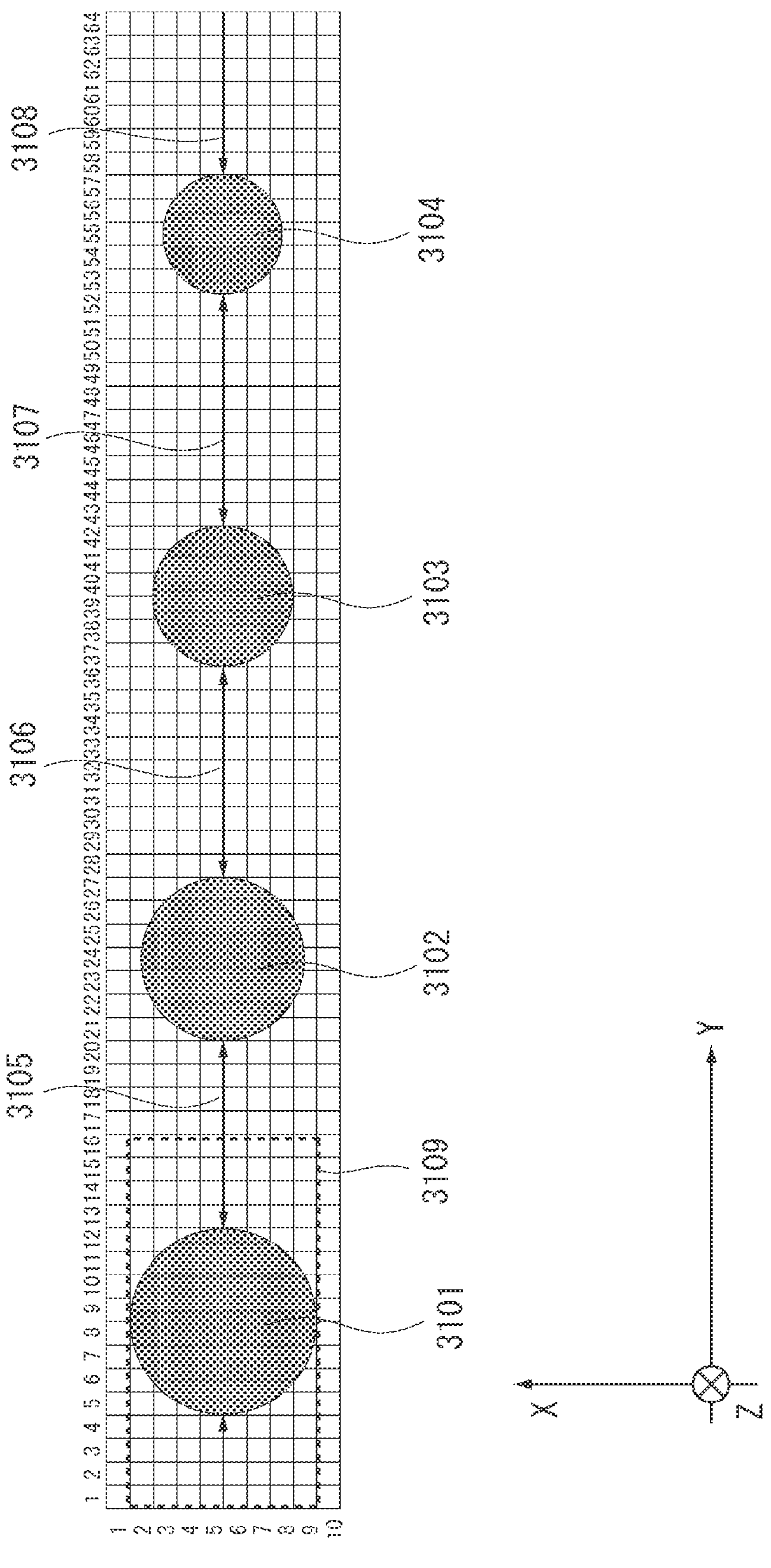
FIG. 9 illustrates an exemplary unit pattern containing isolated patterns differentiated in size.

FIG. 9 illustrates an exemplary unit pattern satisfying the above-mentioned first and second rules. Referring to FIG. 9, dashed lines 3109 illustrate a template area to be extracted as a template pattern in the first image data. The size of this template area is such that the template area can contain at least a part of any one isolated pattern. As the second rule, a plurality of isolated patterns contained in one unit is different in size. In one embodiment, to give uniqueness in size to each isolated pattern, the minimum size difference is equal to or larger than the pixel pitch of the image sensor. In this example, isolated patterns 3101, 3102, 3103, and 3104 are 1.600 mm, 1.400 mm, 1.200 mm, and 1.000 mm in diameter, respectively. Differentiating isolated patterns in size in this way enables distinguishing each individual isolated pattern from other ones in terms of the size regardless of whether all or part of these isolated patterns are contained in the template pattern.

The third rule is a condition related to the interval between adjacent isolated patterns based on the moving speed. The moving directional interval between adjacent isolated patterns is made larger than the moving distance of the conveyance belt 205 during an exposure time for one image capturing. In this example, the maximum moving speed of a speed range detectable with direct sensing is 400 mm/s, and the exposure time for one image capturing by the image sensor, i.e., exposure time for acquisition of one image, is 1 ms. Therefore, the maximum moving distance during the exposure time for one image capturing is 400 mm/s×1 ms=400 μm. Therefore, the interval between any two adjacent isolated patterns is made larger than 400 μm. Referring to FIG. 9, intervals 3105, 3106, 3107, and 3108 between isolated patterns are 1.600 mm, 1.800 mm, 2.000 mm, and 2.200 mm, respectively, which are sufficiently larger than 400 μm.

A reason for the above will be described below. When imaging an object moving at high speed, acquired image data involves image extension in the moving direction as seen in defocusing by camera shake. A difference in moving speed at the time of imaging of the first and second image data may degrade the accuracy of pattern matching since the two pieces of image data are different in amount of image extension. Although with an exposure time sufficiently shorter than the moving speed, image extension can be restrained, an integrated amount of incident light decreases, which results in degradation of image contrast and an increase in image noise.

Figure 10:
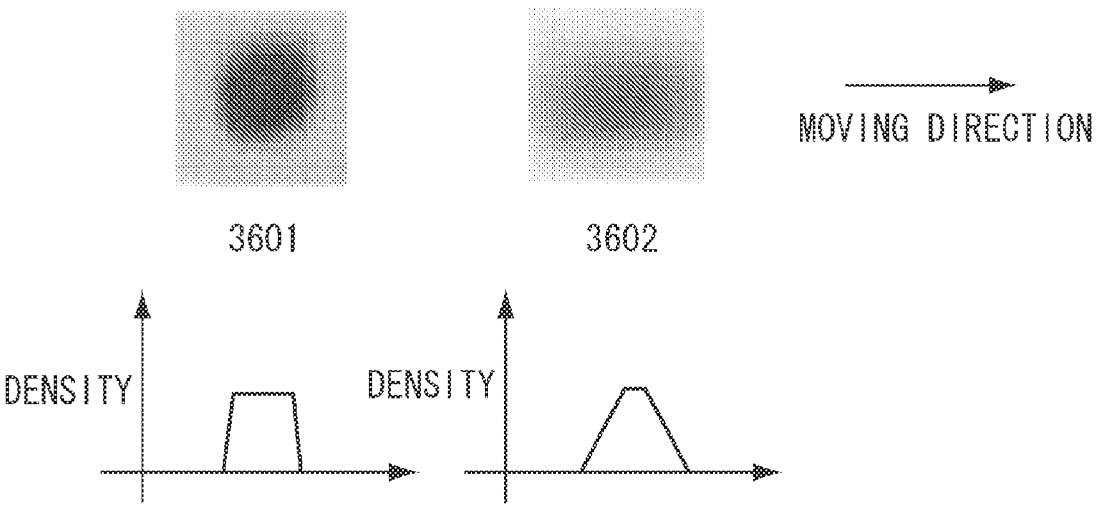
FIG. 10 illustrates a phenomenon of image extension caused by movement.
Figure 11:
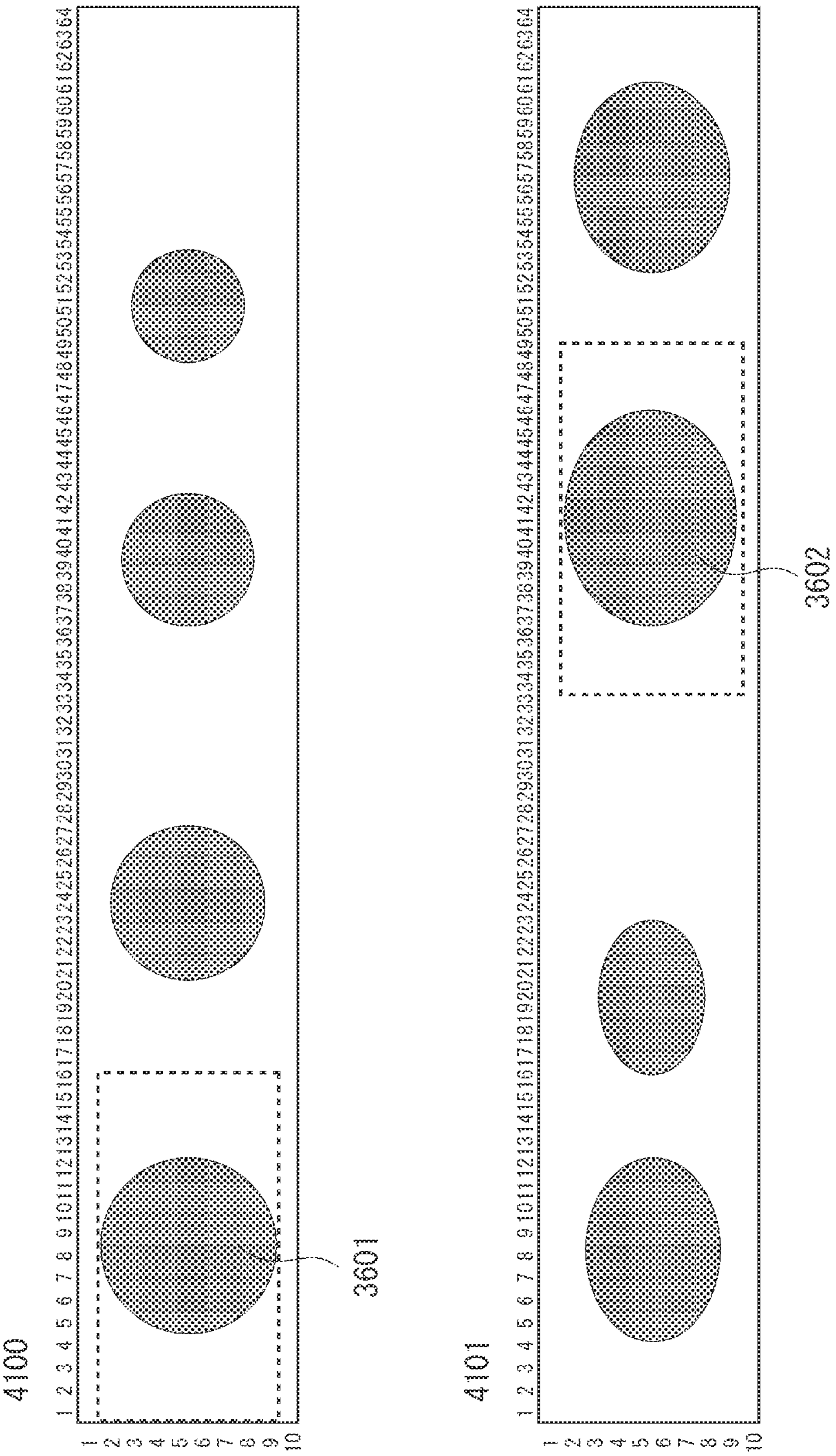
FIG. 11 illustrates first and second image data when an image extension occurs.

Referring to FIG. 10, image data 3601 is obtained by imaging an isolated pattern (having a diameter of 160 μm) in a motionless state during a 1 ms exposure time by using an image sensor having a pixel pitch of 12 μm. On the other hand, image data 3602 is obtained by imaging the same isolated pattern while it is moving at a speed of 150 mm/s. FIG. 11 illustrates states of first image data 4100 and second image data 4101.

Although an identical isolated pattern has been imaged, the image data 3602 has an oblong isolated pattern shape in the moving direction in comparison with the image data 3601. Further, the image data 3602 has slightly defocused edge portions (having a moderate density transition) in comparison with the image data 3601. The amount of extension is determined by the product of the moving speed and the exposure time. Therefore, a difference in moving speed at the time of first and second image data acquisitions results in different image shapes of the isolated pattern because of a difference in amount of image extension.

Figure 12:
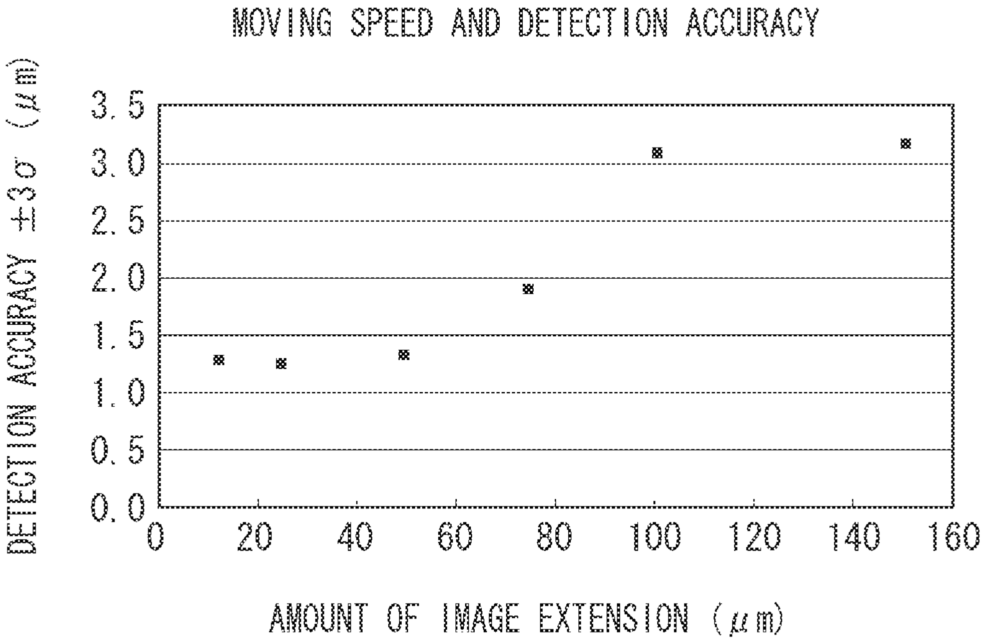
FIG. 12 is a graph illustrating a relation between the amount of image extension and the pattern detection accuracy.

FIG. 12 is a graph illustrating a relation between the amount of image extension (μm) and the pattern detection accuracy (μm). FIG. 12 demonstrates that the pattern detection accuracy decreases (the value of ±3σ increases) with increasing amount of image extension. Therefore, when image extension occurs, an isolated pattern changes in shape, and the pattern detection accuracy in pattern matching decreases.

Figure 13:
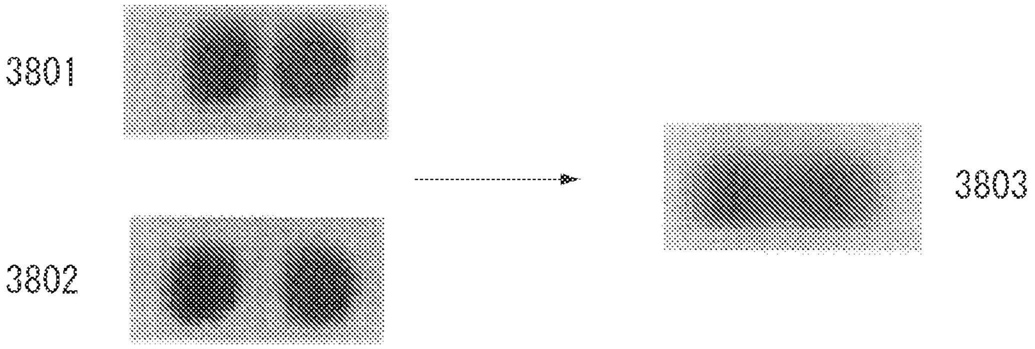
FIG. 13 illustrates a phenomenon of image interference between adjacent isolated patterns.
Figure 14:
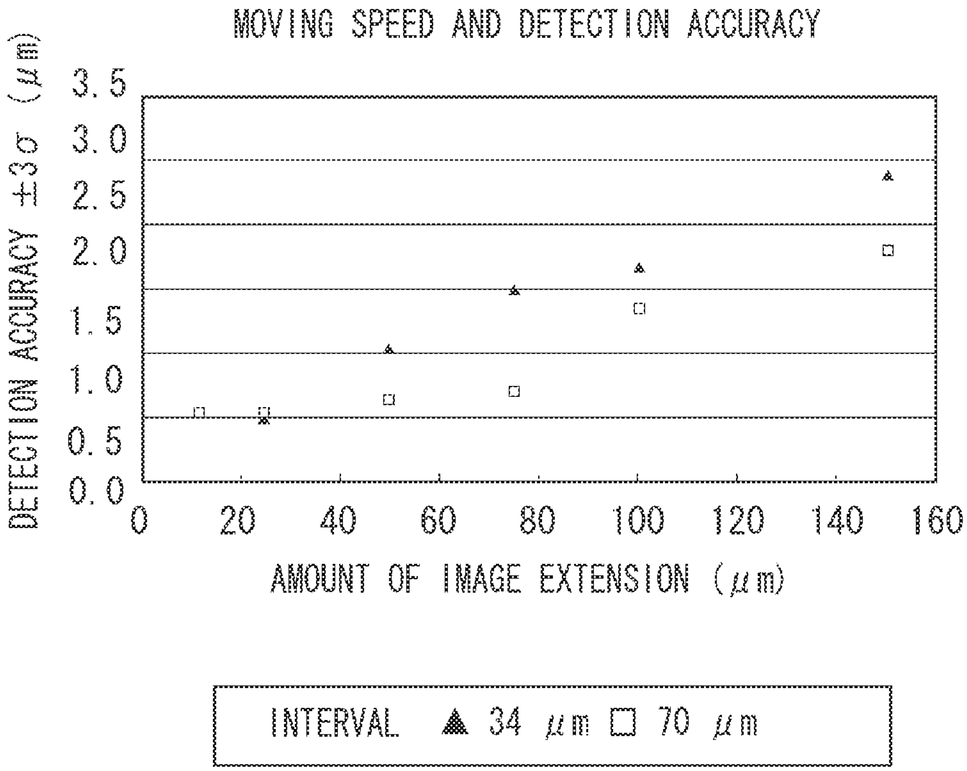
FIG. 14 is a graph illustrating a relation between the amount of image extension and the pattern detection accuracy.

Further, this phenomenon of image extension causes image interference between adjacent isolated patterns possibly resulting in degradation of pattern detection accuracy. A mechanism of image extension and a method for restraining image extension will be described below. Referring to FIG. 13, image data 3801 and 3802 denote two different isolated patterns having an interval between adjacent isolated patterns of 34 μm and 70 μm, respectively. FIG. 14 is a graph illustrating change in pattern detection accuracy with respect to change in the amount of image extension. FIG. 14 demonstrates that a difference in interval between adjacent isolated patterns causes a difference in amount of image extension with which the pattern detection accuracy rapidly decreases. This difference arises because image interference between adjacent isolated patterns by image extension is more likely to occur as an interval between adjacent isolated patterns becomes smaller. Image data 3803 in FIG. 13 illustrates a state of image interference caused by image extension. When image interference occurs, the shape of the isolated pattern is largely deformed causing remarkable degradation in pattern detection accuracy. When an interval between adjacent isolated patterns is 34 μm, image interference occurs with less amount of image extension than when an interval therebetween is 70 μm. For this reason, a difference in tendency of accuracy degradation arises.

To restrain effects of image extension and image interference, the interval, in a moving direction between adjacent isolated patterns, is made larger than the moving distance of the conveyance belt during the exposure time for one image capturing by the image sensor.

The fourth rule is a condition related to the interval between adjacent isolated patterns based on the characteristics of the imaging optical system 303 included in the direct sensor.

The above-mentioned third rule pays attention to image interference between isolated patterns. One of causes of image interference between isolated patterns is the aberration performance of the imaging optical system 303. More specifically, inferior aberration performance of the imaging optical system 303 included in the direct sensor causes image defocusing and deformation of an image captured by the image sensor, which possibly results in the above-mentioned image interference.

Figure 15:
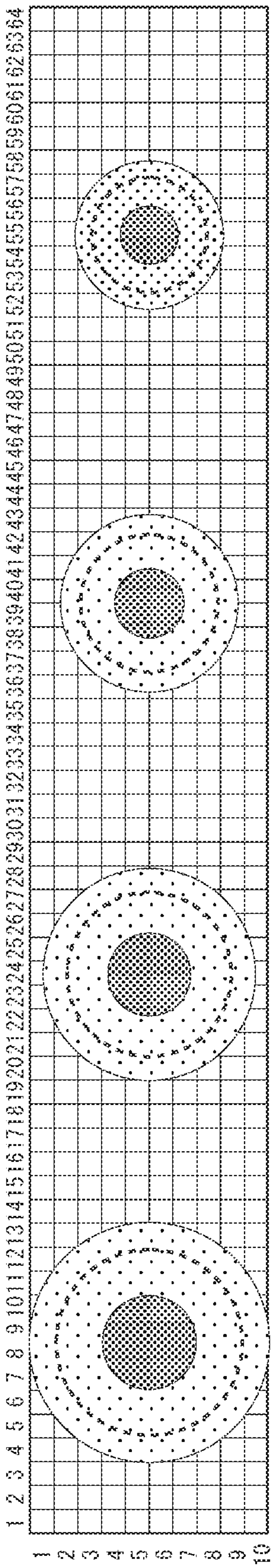
FIG. 15 illustrates a defocusing state of a captured image of isolated patterns.

FIG. 15 illustrates a defocusing state of a captured image of isolated patterns illustrated in FIG. 9. Each of defocused isolated patterns has a larger size and a lower contrast than a focused isolated pattern (white dashed lines). Therefore, since the interval between adjacent isolated patterns decreases, image interference is more likely to occur. To restrain this phenomenon, patterning with wider intervals is performed while predicting image extension and image deformation in consideration of the aberration performance of the imaging optical system 303. In other words, the interval in the moving direction between adjacent isolated patterns is maintained so that image interference between isolated patterns does not occur by the effect of aberration of the imaging optical system 303 when an image is captured by the image sensor.

In one embodiment, the fifth rule is a condition related to the isolated pattern size. When a phenomenon of image extension occurs, the contrast (gray scale) of the image of the isolated pattern decreases. Each graph illustrated in FIG. 10 denotes a density transition of isolated pattern for each of the image data 3601 and 3602. The image data 3602 has a more moderate density transition at edge portions and a narrower range of the peak density value than the image data 3601. This means that the peak density value further decreases when the amount of image extension exceeds the isolated pattern size. This phenomenon becomes noticeable when the isolated pattern size is small with respect to image extension. In image correlation processing for pattern matching, a decrease in contrast (decrease in the amount of pixel gradation information) causes a quantization error, which possibly results in degradation of pattern detection accuracy. To acquire sufficient gradation information even in the case of image extension, the isolated pattern size in the moving direction is larger than the amount of image extension. More specifically, the size of each of the isolated patterns in the moving direction is larger than the moving distance of the conveyance belt during the exposure time at the time of one image capturing. Further, the size is at least four times the size of one pixel of the image sensor.

Figure 16:
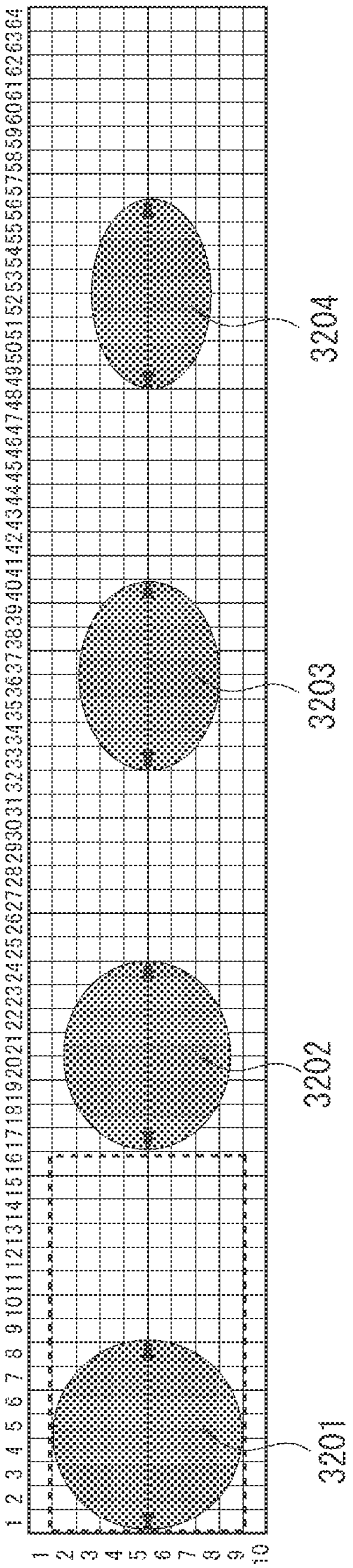
FIG. 16 illustrates an exemplary unit pattern containing isolated patterns differentiated in shape.

FIG. 16 illustrates a modification of the second rule. In the modification, each isolated pattern is given uniqueness by being differentiated in shape. Referring to FIG. 16, dashed lines denote a template area to be extracted as a template pattern in the first image data. The size of this template area is such that it can contain at least a part of any one isolated pattern. A size (diameter) of each of four isolated patterns 3201, 3202, 3203, and 3204 in the moving direction is identical and 1.600 mm, but is different in size (diameter) in a direction perpendicular to the moving direction (also referred to as other direction). In this example, isolated patterns 3201, 3202, 3203, and 3204 are 1.600 mm, 1.400 mm, 1.200 mm, and 1,000 mm in size in the other direction, respectively. The isolated pattern 3201 is a true circle. The isolated patterns 3202, 3203, and 3204 are ellipses differentiated in shape, i.e., gradually collapsing in the moving direction. As a result, the shape of each isolated pattern contained in the template pattern is given uniqueness.

Figure 17:
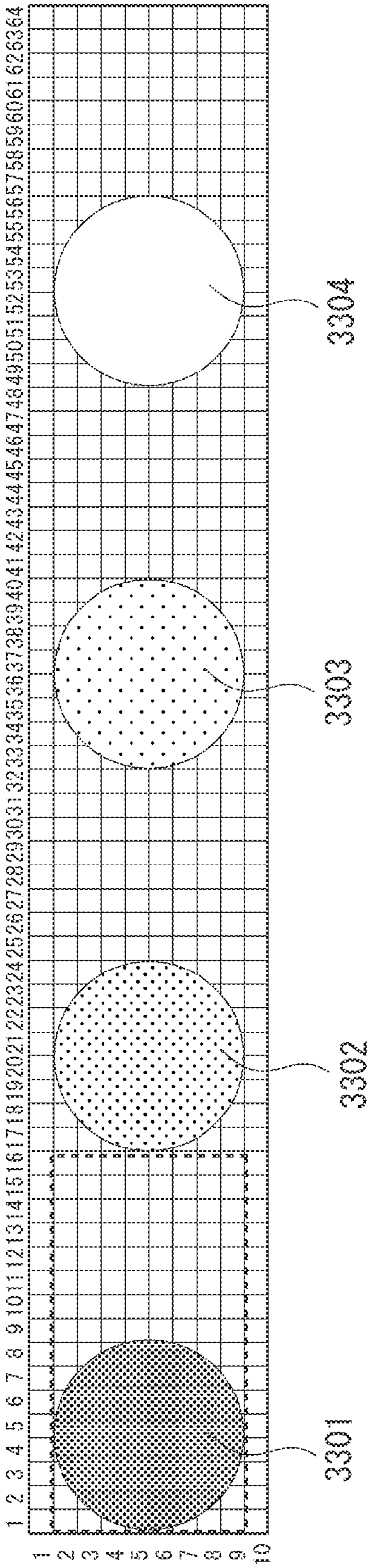
FIG. 17 illustrates an exemplary unit pattern containing isolated patterns differentiated in contrast, density, or color.

FIG. 17 illustrates another modification of the second rule. In the modification, each isolated pattern is given uniqueness by being differentiated in at least any one of contrast, density, and color. Each of four isolated patterns 3301, 3302, 3303, and 3304 is identical in shape and size (a true circle having a diameter of 1.600 mm), but is different in contrast (gray scale), density, or color. As a result, each isolated pattern contained in the template pattern is given uniqueness by being differentiated in contrast, density, or color.

Figure 18:
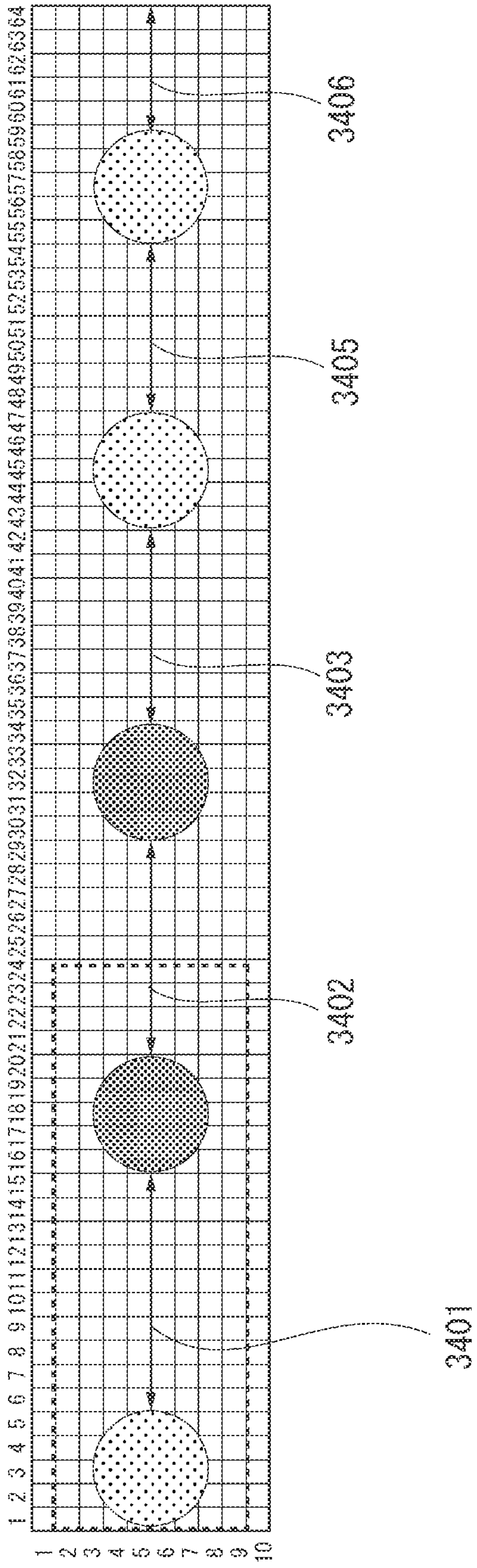
FIG. 18 illustrates an exemplary unit pattern containing isolated patterns with arrangement differentiated in a moving direction.

FIG. 18 illustrates still another modification of the second rule. In the modification, each isolated pattern is differentiated in interval in a moving direction. Each isolated pattern is identical in shape and size (a true circle having a diameter of 0.500 mm), but is different in interval to an adjacent isolated pattern (intervals 3401, 3402, 3403, 3404, 3405, and 3406). In this example, the intervals 3401, 3402, 3403, 3404, 3405, and 3406 are 2.000 mm, 1.800 mm, 1.600 mm, 1.400 mm, and 1.000 mm, respectively. As a result, each isolated pattern contained in the template pattern is given uniqueness by being differentiated in interval to an adjacent isolated pattern.

Figure 19:
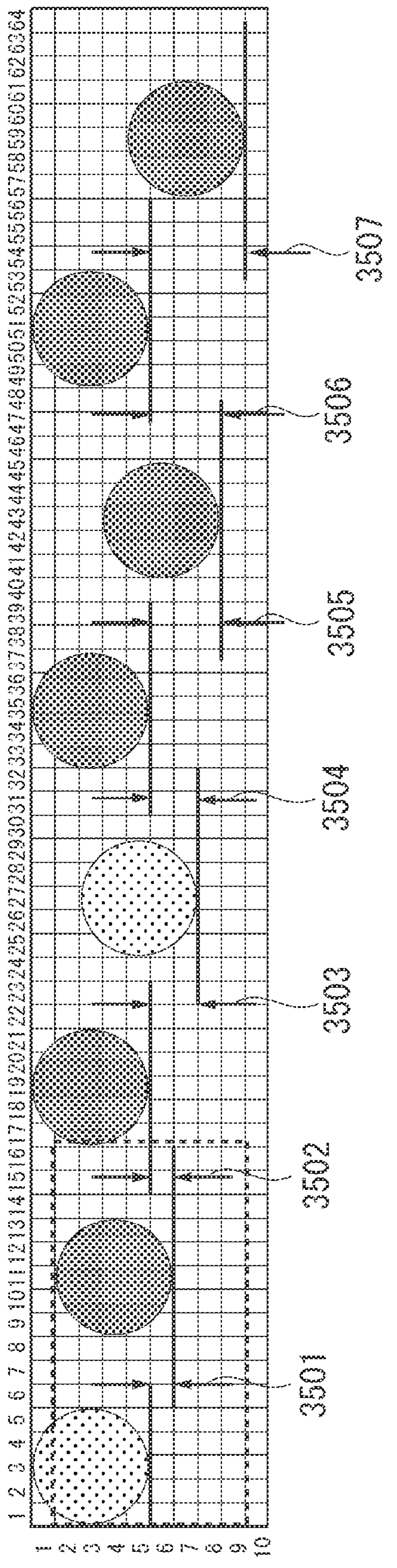
FIG. 19 illustrates an exemplary unit pattern containing isolated patterns with arrangement differentiated in a direction perpendicular to the moving direction.

FIG. 19 illustrates still another modification of the second rule. In the modification, each isolated pattern is differentiated both in interval in a moving direction and in interval in a direction perpendicular to the moving direction. Each isolated pattern is identical in shape and size (a true circle having a diameter of 1.000 mm) and in interval in the moving direction to an adjacent isolated pattern, but is different in interval to an adjacent isolated pattern in a direction perpendicular to the moving direction (intervals 3501, 3502, 3503, 3504, 3505, 3506, 3506, and 3507). In this example, the intervals 3501, 3502, 3503, 3504, 3505, 3506, 3506, and 3507 are 0.200 mm, −0.200 mm, 0.400 mm, −0.400 mm, 0.600 mm, −0.600 mm, and 0.800 mm, respectively. As a result, each isolated pattern contained in the template pattern is given uniqueness by being differentiated in interval to an adjacent isolated pattern in a direction perpendicular to the moving direction. Isolated patterns may be arranged based on the modifications of FIGS. 19 and 18, i.e., each isolated pattern may be differentiated both in interval in a moving direction and in interval in a direction perpendicular to the moving direction.

Any combination of the above-mentioned modifications may be used. More specifically, each isolated pattern is given uniqueness with which each pattern is distinguishable from other ones, by being differentiated in at least anyone of size, shape, contrast, density, and color. Although the above descriptions have been made based on cases where each isolated pattern has a circular form, the isolated pattern shape is not limited thereto but may be any other shape, for example, a polygon (a rectangle or triangle) and any combination of polygons and circles.

As mentioned above, the form of each isolated pattern in a detection pattern, the size of a template area from which the template pattern is to be extracted, and the size of the seek area are associated with each other so that a part of the detection pattern contained in the template pattern serves as a unique pattern in the seek area. If accuracy degradation is permissible to a certain extent, it is not necessary to satisfy all of the above-mentioned five rules. For example, only the first and second rules may be applied. Alternatively, at least any one of the third to fifth rules may be added to the first and second rules.

According to the above-mentioned exemplary embodiments, pattern matching can be accurately determined and high-precision direct sensing can be achieved. Accordingly, media can be conveyed with high precision, thus a recording apparatus capable of high-quality image recording is achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-250830 filed Oct. 30, 2009, which is hereby incorporated by reference herein in its entirety.

What is claimed is:

1. An apparatus comprising:

a conveyance mechanism including a conveyance belt on which detection patterns containing a plurality of isolated patterns are intentionally marked, configured to convey a medium in a predetermined direction;

a sensor configured to capture an image of an area on the conveyance belt containing at least a part of the detection patterns to acquire first and second data; and a processing unit configured to extract a template pattern containing a part of the detection patterns from the first data, and seek an area having a correlation with the template pattern within a seek area of the second data to obtain a moving state of the conveyance belt, wherein state of the plurality of isolated patterns contained in the detection patterns, size of the template pattern, and size of the seek area are associated with each other so that the part of the detection patterns contained in the template pattern serves as a unique pattern in the seek area, wherein each of the isolated patterns is given uniqueness with which each pattern is distinguishable from other patterns, by a combination of or at least any one of size, shape, contrast, density, color, and interval arrangement.

2. The apparatus according to claim 1, wherein each detection pattern is formed by repetitively arranging a unit pattern over an entire circumferential surface of the conveyance belt in the predetermined direction, and the unit pattern has a predetermined unit length not less than a length of the imaging area.

3. The apparatus according to claim 1, wherein an interval in the predetermined direction between isolated patterns contained in the unit pattern is smaller than a size of the template area in the predetermined direction.

4. The apparatus according to claim 1, wherein an interval in the predetermined direction between adjacent isolated patterns is larger than a moving distance of the conveyance belt during an exposure for one image capturing.

5. The apparatus according to claim 1, wherein a size of each of the plurality of isolated patterns in the predetermined direction is larger than a maximum moving distance of the conveyance belt during an exposure for one image capturing.

6. The apparatus according to claim 1, wherein an interval in the predetermined direction between adjacent isolated patterns is maintained such that image interference between isolated patterns does not occur due to an effect of aberration of an optical system when an image is captured.

7. The apparatus according to claim 1, wherein the detection patterns are marked using a combination of or at least any one of the following methods: directly painting a coating material onto the conveyance belt; sticking a patterned seal to the conveyance belt; forming concave and convex portions on a surface of the conveyance belt; scraping a film surface of the conveyance belt; and applying laser marking to a material of the conveyance belt.

8. The apparatus according to claim 1, further comprising:

a control unit configured to control a drive of the conveyance mechanism based on the moving state.

9. The apparatus according to claim 8, further comprising:

an encoder configured to detect a rotating state of a drive roller for driving the conveyance belt, wherein the control unit controls a drive of the drive roller based on the detected rotating state and the moving state.

10. A recording apparatus comprising:

the apparatus according to claim 1; and a recording unit configured to perform recording on the medium.

11. A method comprising:

conveying a medium in a predetermined direction by a conveyance mechanism including a conveyance belt on which detection patterns containing a plurality of isolated patterns are intentionally marked;

capturing an image of an area on the conveyance belt containing at least a part of the detection patterns to acquire first and second data; and extracting a template pattern containing a part of the detection patterns from the first data, and seeking an area having a correlation with the template pattern within a seek area of the second data to obtain a moving state of the conveyance belt, wherein state of the plurality of isolated patterns contained in the detection patterns, size of the template pattern, and size of the seek area are associated with each other so that the part of the detection patterns contained in the template pattern serves as a unique pattern in the seek area, wherein each of the isolated patterns is given uniqueness with which each pattern is distinguishable from other patterns, by a combination of or at least any one of size, shape, contrast, density, color, and interval arrangement.

12. The method according to claim 11, further comprising forming each detection pattern by repetitively arranging a unit pattern over an entire circumferential surface of the conveyance belt in the predetermined direction, and the unit pattern has a predetermined unit length not less than a length of the imaging area.

13. The method according to claim 11, wherein an interval in the predetermined direction between adjacent isolated patterns is larger than a moving distance of the conveyance belt during an exposure for one image capturing.

14. The method according to claim 11, wherein a size of each of the plurality of isolated patterns in the predetermined direction is larger than a maximum moving distance of the conveyance belt during an exposure for one image capturing.

15. The method according to claim 11, wherein an interval in the predetermined direction between adjacent isolated patterns is maintained such that image interference between isolated patterns does not occur due to an effect of aberration of an optical system when an image is captured.

16. The method according to claim 11, further comprising marking the detection patterns by using a combination of or at least any one of the following methods: directly painting a coating material onto the conveyance belt; sticking a patterned seal to the conveyance belt; forming concave and convex portions on a surface of the conveyance belt; scraping a film surface of the conveyance belt; and applying laser marking to a material of the conveyance belt.

17. The method according to claim 11, further comprising:

controlling a drive of the conveyance mechanism based on the moving state.

18. The method according to claim 17, further comprising:

detecting a rotating state of a drive roller for driving the conveyance belt, wherein the controlling a drive of the drive roller is based on the detected rotating state and the moving state.

* * * * *